United States Patent
Toroman et al.

(10) Patent No.: US 12,045,046 B2
(45) Date of Patent: Jul. 23, 2024

(54) MANAGING MACHINE OPERATIONS USING ENCODED MULTI-SCALE TIME SERIES DATA

(71) Applicant: Falkonry Inc., Cupertino, CA (US)

(72) Inventors: Vukasin Toroman, Karlsruhe (DE); Daniel Kearns, Half Moon Bay, CA (US); Charu Singh, Santa Clara, CA (US); Vinit Acharya, Sunnyvale, CA (US); Nikunj Mehta, Sunnyvale, CA (US)

(73) Assignee: Falkonry Inc., Cupertino, CA (US)

( * ) Notice: Subject to any disclaimer, the term of this patent is extended or adjusted under 35 U.S.C. 154(b) by 147 days.

(21) Appl. No.: 17/493,800

(22) Filed: Oct. 4, 2021

(65) Prior Publication Data
US 2023/0107337 A1    Apr. 6, 2023

(51) Int. Cl.
*G05B 23/02*    (2006.01)
*G06F 16/22*    (2019.01)
(Continued)

(52) U.S. Cl.
CPC ..... *G05B 23/0235* (2013.01); *G05B 23/0221* (2013.01); *G06F 16/2228* (2019.01);
(Continued)

(58) Field of Classification Search
CPC ............ G05B 23/0235; G05B 23/0221; G05B 23/024; G06F 16/2228; G06F 16/24556;
(Continued)

(56) References Cited

U.S. PATENT DOCUMENTS 6,717,576 B1    4/2004    Duluk et al.
7,385,608 B1    6/2008    Baldwin
(Continued)

FOREIGN PATENT DOCUMENTS

CN    109710636 B  *  10/2022    ......... G05B 19/4065
KR    102482240 B1  *  12/2022
(Continued)

OTHER PUBLICATIONS

WO-2023059432-A1_translated (Year: 2023).*
(Continued)

*Primary Examiner* — Manish S Shah
*Assistant Examiner* — Michael J Singletary
(74) *Attorney, Agent, or Firm* — Duane Morris LLP

(57) ABSTRACT

Techniques for managing machine operations using encoded multi-scale time series data are provided. In one technique, operational data is received from a sensor coupled to an industrial device. For each portion in a first set of portions of the operational data (where each portion corresponds to a first time scale), first aggregated data is generated based on time series data from that portion and a first encoding is generated based on the first aggregated data. For each portion in a second set of portions of the operational data (where each portion of the second set corresponds to a second time scale that is different than the first time scale), second aggregated data is generated based on time series data from that portion and a second encoding is generated based on the second aggregated data. The operational data is classified to determine a condition of the industrial device during the time interval based on the first and second encodings.

20 Claims, 6 Drawing Sheets

(51) Int. Cl.
  *G06F 16/2455* (2019.01)
  *G06F 16/2458* (2019.01)
  *G06F 18/214* (2023.01)
  *G06N 20/00* (2019.01)

(52) U.S. Cl.
  CPC .... *G06F 16/24556* (2019.01); *G06F 16/2477* (2019.01); *G06F 18/214* (2023.01); *G06N 20/00* (2019.01)

(58) Field of Classification Search
  CPC ............... G06F 16/2477; G06F 18/214; G06F 18/23213; G06F 18/24143; G06N 20/00
  See application file for complete search history.

(56) References Cited

U.S. PATENT DOCUMENTS

| | | | |
|---|---|---|---|
| 7,697,816 | B2 | 4/2010 | Takada et al. |
| 10,902,062 | B1 | 1/2021 | Guha et al. |
| 11,080,127 | B1 | 8/2021 | Vincent et al. |
| 2012/0007868 | A1 | 1/2012 | Buck |
| 2013/0262035 | A1 | 10/2013 | Mills |
| 2015/0222495 | A1 | 8/2015 | Mehta et al. |
| 2016/0080438 | A1 | 3/2016 | Liang |
| 2016/0203176 | A1 | 7/2016 | Mills |
| 2017/0206464 | A1 | 7/2017 | Clayton et al. |
| 2017/0228460 | A1 | 8/2017 | Amel |
| 2017/0255709 | A1 | 9/2017 | Cho et al. |
| 2017/0317874 | A1 | 11/2017 | Borah |
| 2018/0032312 | A1 | 2/2018 | Hansen |
| 2019/0095508 | A1 | 3/2019 | Porath |
| 2019/0147300 | A1 | 5/2019 | Bathen et al. |
| 2019/0258677 | A1 | 8/2019 | Beedgen et al. |
| 2020/0012657 | A1 | 1/2020 | Walters et al. |
| 2020/0050182 | A1 | 2/2020 | Cheng et al. |
| 2020/0064822 | A1 | 2/2020 | Song et al. |
| 2020/0082013 | A1 | 3/2020 | Triplet |
| 2020/0226490 | A1* | 7/2020 | Abdulaal ............... G06N 20/00 |
| 2020/0234474 | A1 | 7/2020 | Mittelstadt |
| 2020/0292608 | A1 | 9/2020 | Yan et al. |
| 2020/0334254 | A1 | 10/2020 | Arye |
| 2020/0379454 | A1 | 12/2020 | Trinh et al. |
| 2021/0035266 | A1 | 2/2021 | Toroman |
| 2021/0124983 | A1 | 4/2021 | Axenie et al. |
| 2021/0125387 | A1 | 4/2021 | Kawata et al. |
| 2021/0149384 | A1* | 5/2021 | Dittmer ................... H04L 43/16 |
| 2021/0247754 | A1* | 8/2021 | Takahashi ............... B29C 45/76 |
| 2022/0012538 | A1* | 1/2022 | Mizoguchi .......... G06F 18/2415 |
| 2022/0180478 | A1 | 6/2022 | Toroman et al. |
| 2022/0195861 | A1 | 6/2022 | Patino Virano et al. |
| 2023/0085991 | A1* | 3/2023 | Liebman ............ G05B 23/0259 700/79 |

FOREIGN PATENT DOCUMENTS

| | | | | |
|---|---|---|---|---|
| TW | 202141212 A | * | 11/2021 | ......... G05B 23/0221 |
| WO | WO-2023059432 A1 | * | 4/2023 | ......... G05B 23/0221 |

OTHER PUBLICATIONS

TW-202141212-A_Translated (Year: 2021).*
KR-102482240-B1_Translated (Year: 2022).*
CN-109710636-B_Translated (Year: 2022).*
Vaswani et al., Ashish, "Attention Is All You Need", 31st Conference on Neural Information Processing Systems (NIPS 2017), Dec. 6, 2017, pp. 1-15.
Devlin, Jacob et al., "BERT: Pre-training of Deep Bidirectional Transformers for Language Understanding", May 24, 2019, 16 pages.
Toroman, U.S. Appl. No. 16/939,568, filed Jul. 27, 2020, Notice of Allowance and Fees Due, Jan. 20, 2022.
Toroman, U.S. Appl. No. 16/939,568, filed Jul. 27, 2020, Non-Final Rejection, Sep. 15, 2021.
Toroman, U.S. Appl. No. 16/939,568, filed Jul. 27, 2020, Interview Summary, Mar. 16, 2021.
Toroman, U.S. Appl. No. 16/939,568, filed Jul. 27, 2020, Office Action, Jan. 13, 2021.
Toroman, U.S. Appl. No. 16/939,568, filed Jul. 27, 2020, Final Office Action, Apr. 2, 2021.
Toroman, U.S. Appl. No. 16/939,568, filed Jul. 27, 2020, Advisory Action, May 27, 2021.
The International Searching Authority, "Search Report" in application No. PCT/US2020/043735, dated Oct. 9, 2020, 15 pages.
Jugel et al., "M4 Visualization-Oriented Time Series Data Aggregation", dated Jun. 30, 2014, pp. 797-808.
Current Claims in application No. PCT/US2020/043735, dated Oct. 2020, 4 pages.
Battle et al., "Dynamic Prefetching of Data Tiles or Interactive Visualization", dated Jun. 30, 2016, SIGMOD Proceedings of the 2016 International Conference on Management of Data, pp. 1363-1375.
International Search Report and Written Opinion for Application No. PCT/US2023/078115, Mailed Mar. 1, 2024, 13 pages.
International Search Report and Written Opinion for Application No. PCT/US2023/075303, Mailed Feb. 2, 2024, 15 pages.
Zekai Chen et al: "Learning.Graph Structures .with Transformer for Multivariate Time Series Anomaly Detection in IoT", arxiv.org, Cornell University Library, 201 Olin Library Cornell University Ithaca, NY 14853, Jan. 17, 2022, 12 pages.

* cited by examiner

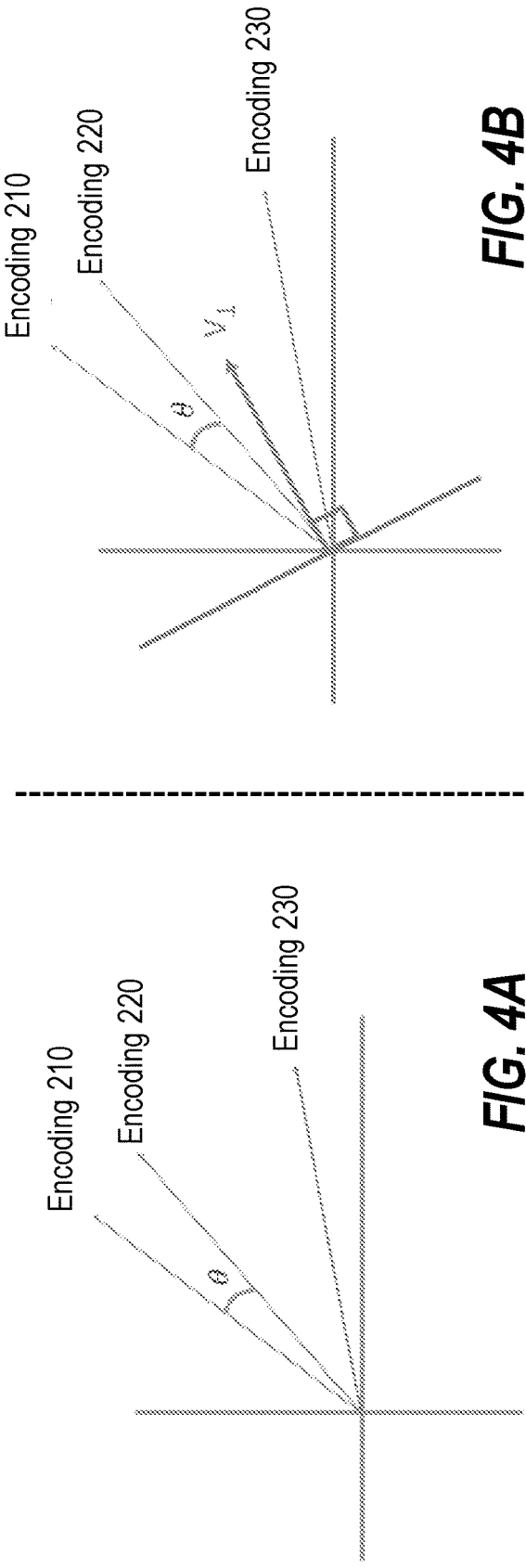
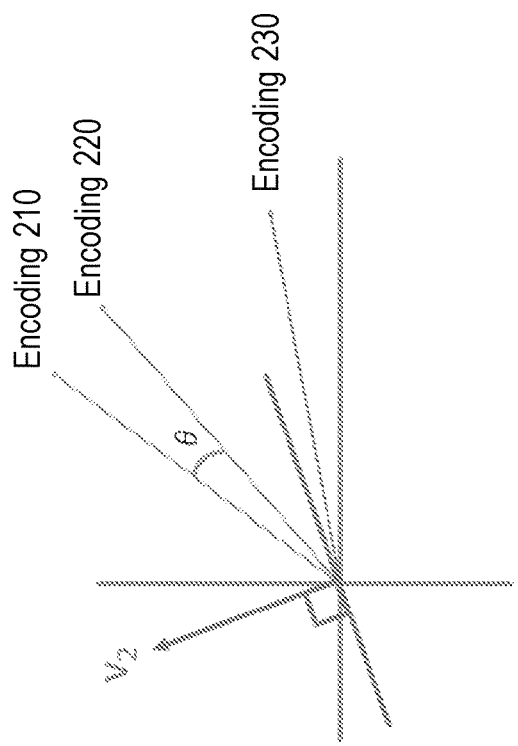
FIG. 4A
FIG. 4B
FIG. 4C

MANAGING MACHINE OPERATIONS USING ENCODED MULTI-SCALE TIME SERIES DATA

RELATED CASE

This application is related to U.S. patent application Ser. No. 16/939,568, entitled "FLUID AND RESOLUTION-FRIENDLY VIEW OF LARGE VOLUMES OF TIME SERIES DATA," filed on Jul. 27, 2020, the contents of which are hereby incorporated by reference as if fully set forth herein.

TECHNICAL FIELD

The present disclosure relates to machine learning and, more particularly, to encoding multi-scale time series data to manage machine operations

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section:

Manufacturing and process engineers are increasingly managing and reviewing unprecedented amounts of operational data. For example, machines and sensors in industries, such as oil and gas industry, metals and mining industry, and semiconductor industry, produce terabytes of operational data over time from across the enterprise. There are numerous challenges that arise in managing and reviewing large volumes of data. These challenges range from delivering and presenting data at the frontend to processing and storage limitations at the backend. One approach to processing operational data is to create a snapshot of the performance of a machine or industrial process at different points in time, each snapshot representing a different portion of the operation data. Then the snapshots can be compared directly with each other. However, such an approach requires a significant amount of storage and, more importantly, is unable to accurately capture features (such as slope, highs, and lows) of different snapshots, particularly if two snapshots are not perfectly aligned.

Thus, it would be helpful to have an improved solution to processing, storing, or visualizing large volumes of data.

BRIEF DESCRIPTION OF THE DRAWINGS

In the drawings:

FIG. 4A is an example graph that illustrates how a hashing technique may be used to group similar encodings, in an embodiment;

FIG. 4B is an example graph that illustrates how a hashing technique may be used to group similar encodings, in an embodiment;

FIG. 4C is an example graph that illustrates how a hashing technique may be used to group similar encodings, in an embodiment;

DETAILED DESCRIPTION

Figure 1:
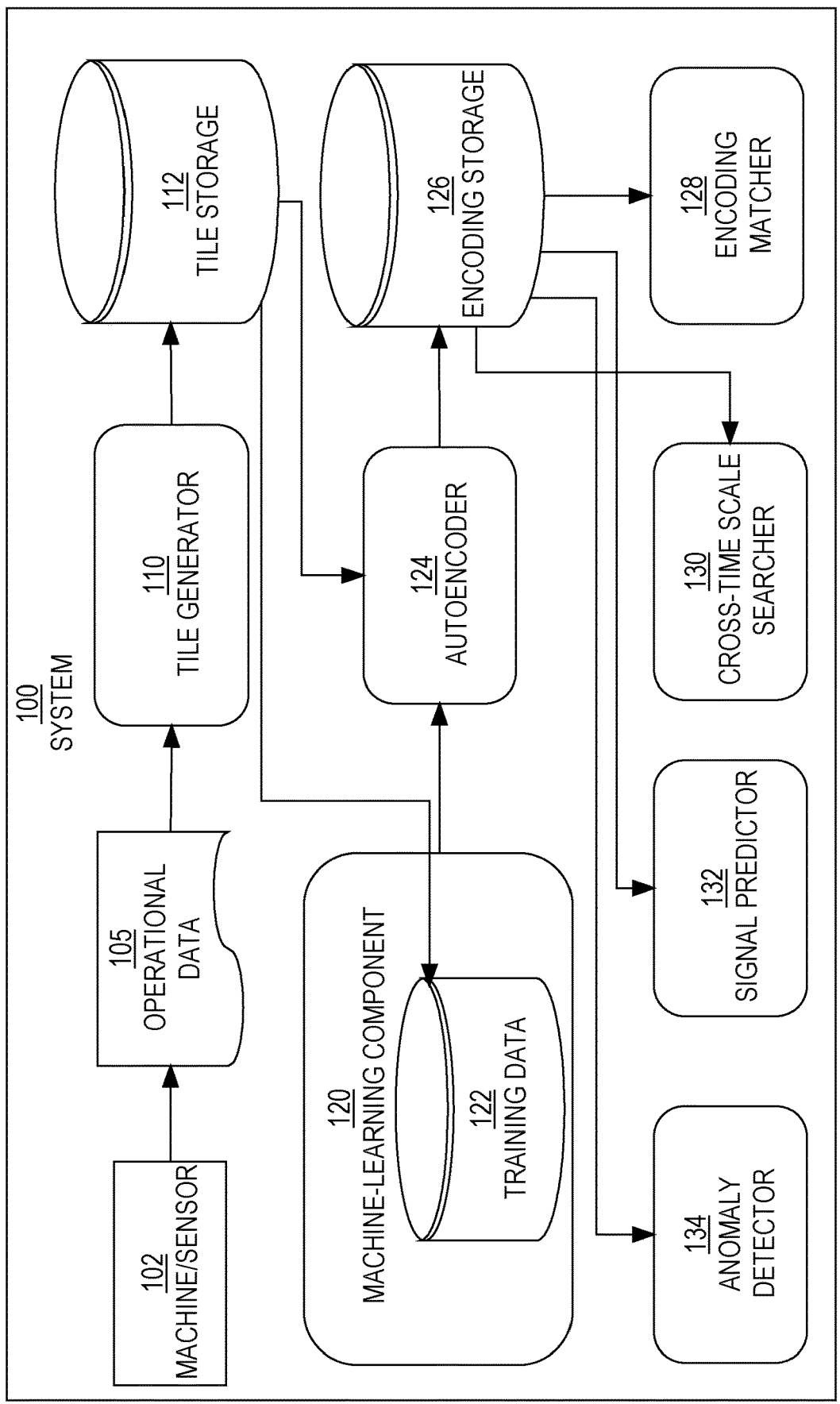
FIG. 1 is a block diagram that depicts an example system that generates multi-scale embeddings based on operational data, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0. General Overview

A system and method for generating, using one or more autoencoders or other feature learning and representation techniques, encodings that represent operational time series data generated by one or more machines, such as industrial machines. Different encodings represent different periods of time at different time resolutions or scales. For example, a different encoding is generated for each minute of time series data over a period of time and another encoding is generated for an hour of time series data that covers that period of time. If two different portions of time series data are similar, then the one or more autoencoders ensure that their respective encodings are similar and, therefore, are found near each other in multi-dimensional space. The encodings are indexed based on their respective values, such that a search for a particular encoding will efficiently identify other encodings that are similar to the particular encoding. Thus, each encoding represents behavior or condition of a machine or industrial process at a different moment in time, allowing the system to identify similar behaviors and further manage machine operations.

Embodiments improve computer-related technology, particularly the processing of multi-scale operational time series data. Encodings are a compact representation of time series data instead of the time series data itself. Specifically, raw operational data is first aggregated over time, and encodings are generated from the aggregate values, leading to multiple levels of abstraction.

With encodings that are generated using techniques described herein and that are efficiently indexed, one or more beneficial downstream processing may be performed, such as similarity search, contextual search across multiple time scales, anomaly detection, generating relevant anomaly measures, and signal prediction. One or more of these downstream processes may include classifiers or estimators involving one or more neural networks or other machine-learned models. Thus, encodings may be input to these downstream processes. The compact representation reduces the time and storage required to train downstream machine learning models that leverage the encodings. Also, encodings allow for algebraic manipulation such as comparison and aggregation over multiple time series.

In addition, encodings are generated using an efficient machine learning model with simplified model components in some embodiments, further reducing the resource utilization requirements. With these technical improvements, the overall system may generate and utilize encodings onsite rather than transmitting the time series data (or even embeddings or alerts themselves) to a cloud system or a central system for further processing.

Embodiments also improve other technical fields, including industrial operation management. By creating and leveraging multi-scale data, the condition of a machine component in an industrial environment at a given time (in terms of a unit time interval) is captured with rich data representing not only actual values generated by the sensors associated with the machine component at the time point of interest but also contextual values generated by those sensors that cover the neighboring time points at different scales. The encodings generated from the multi-scale data can thus be a more accurate or comprehensive representation of the machine behavior at the given time and could lead to improved handling or prediction of abnormal conditions in machine operation.

2.0. System Overview

FIG. 1 is a block diagram that depicts an example system 100 that generates multi-scale embeddings based on operational data, in an embodiment. System 100 includes one or more industrial device, machines, and/or sensors 102 that generate operational data 105 that includes time series data. Thus, system 100 may be an onsite system that is located on the same premises as industrial device 102 that produces the operational data. Alternatively, system 100 may be remote relative to industrial device 102. In such a scenario, operational data 105 is transmitted (directly or indirectly) from industrial device 102 over a computer network (e.g., the Internet) to system 100.

Industrial device 102 may produce an analog signal that is transformed into a digital signal that is processed by tile generator 110. Each stream of time series data generally corresponds to one signal over a time range and may comprise one or more feature vectors. Operational data generally refers to actual or raw data generated by a machine, device, or equipment during operation of the machine, device, or equipment and may include predicted data generated by one or more machine learning (ML) prediction models in some embodiments.

Time series data may be numerical or categorical. Example numerical time series data may relate to temperature, pressure, or flow rate generated by a machine, device, or equipment, or confidence scores of state predictions made by a ML prediction model. Example categorical time series data has a fixed set of values, such as different states of a machine, device, or equipment, or state predictions made by a prediction model.

3.0. Training and Executing Digital Encoding Models 3.1. Tiles

System 100 includes a tile generator 110 that generates tiles based on operational data. A tile comprises aggregated times series data at a certain time resolution and represents a portion of operational data corresponding to a duration of time covered in that tile. Tile generator 110 generates tiles at different time resolutions or scales and provide aggregate measures, such as minimums, maximums, means, standard deviations, and variances. In an embodiment, every tile at a certain resolution level (e.g., a minute time scale) covers the same relative duration and has starting points so that none of the tiles overlap in terms of timepoints in them. For example, for a particular minute duration on a particular day, tile generator 110 generates 60 tiles (each representing operational data corresponding to a different second with the particular minute) with each tile representing operational data corresponding to the particular minute. Tile generator 110 may generate tiles based on other time scales, such as microseconds ($10^{-6}$), milliseconds ($10^{-3}$), centiseconds ($10^{-2}$), deciseconds ($10^{-1}$), seconds ($10^{0}$), dekaseconds ($10^{1}$), hectoseconds ($10^{3}$), and kiloseconds ($10^{3}$).

Tiles at each scale have a fixed size. Each tile thus includes a time series, where the number of data points in the time series is equal to the fixed size and each data point represents an aggregate of values in the raw time series generated by sensors, such as a mean of five values in the raw time series. The tiles are typically generated from the bottom up, where individual data points in raw time series data exist at the bottom scale. Data points at the current scale can be rolled up and aggregated to form the data points at the next higher scale, and the roll-up process can repeat up to the top scale. As raw time series data is generated by sensors, the tiles can be generated and stored in real time.

Tile generator 110 (or another element of system 100) stores tiles in tile storage 112, which is persistent or non-volatile storage. A tile may be represented in any number of ways in tile storage 112. For example, each tile may be stored in a row in a relational table. Columns of the table include a column for each tile attribute, such as a vector or array of aggregated values, a starting timestamp, a time scale or resolution of the tile, an offset into operational data from which the tile was generated, and a source identifier that identifies the machine/sensor that generated the operational data. This latter column is helpful in situations where there are multiple signals and, therefore, tiles can be organized or processed based on source.

As another example, a tile may be stored as an object in an object database. Embodiments are not limited to how tiles are organized or stored. Additional details regarding tile generation can be found in U.S. patent application Ser. No. 16/939,568.

3.2. Machine Learning and Autoencoder

In an embodiment, system 100 includes a machine learning component 120 that trains one or more autoencoders 124 based on training data 122. In an alternative embodiment, machine learning component 120 resides on a computer system that is remote relative to system 100. In other embodiments, the machine learning component 120 builds other digital models for feature learning and representation, which can be used in place of the one or more autoencoders 124, to generate encodings from the training data 122. Examples of such digital models include independent component analysis (ICA), local linear embedding, unsupervised dictionary learning, or a restricted Boltzmann machine (RBM).

An autoencoder is a type of artificial neural network (ANN), which is based on a collection of connected units or nodes, referred to as "artificial neurons." Artificial neurons loosely model the neurons in a biological brain. An artificial neuron receives a signal, processes the signal, and transmits the resulting signal to one or more other neurons. Each signal is a real number and the output of each neuron is computed by a non-linear function of the sum of its inputs. The connections are referred to as "edges." Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals travel from the first layer (the input layer) to the last layer (the output layer), potentially after traversing one or more inner (or hidden) layers.

While ANNs may be used in supervised learning or unsupervised learning, an autoencoder is used to learn efficient encodings (or representations) of strictly unlabeled data (unsupervised learning). An encoding comprises a series (or vector) of real values, such as integers or floating point values. An autoencoder learns an encoding for a set of data by training the network to ignore insignificant data ("noise"). An autoencoder has two main parts: (1) an encoder that maps the input into a code and (2) a decoder that maps the code to a reconstruction of the input. During training, an autoencoder can validate and refine an encoding generated in (1) by attempting to regenerate the input (from which the encoding was generated) from the encoding itself in (2). Each value in the encoding corresponds to a different latent dimension. Thus, if an encoding is 32 values, then there are 32 latent dimensions. By training autoencoder 124 based on training data 122, autoencoder attempts to "understand" the variables that affect the behavior of a signal and model these variables in the latent space. During execution, (1) is run given input to generate the desired encoding of the given input.

In an embodiment, autoencoder 124 is a variational autoencoder (VAE). In traditional autoencoders, an encoding comprises a single value for each latent attribute. In contrast, in VAEs, each latent attribute for a given input is represented as a probability distribution. Then, when decoding from the latent state, each latent state distribution is randomly sampled from to generate a vector as input for the decoder portion of the model. For variational autoencoders, the encoder part is referred to as the recognition model, whereas the decoder part is referred to as the generative model. In other embodiments, autoencoder 124 is a regularized autoencoder or another type of autoencoder.

In a related embodiment, autoencoder 124 is a convolutional VAE (CVAE), where the encoder part and the decoder part each comprises one or more convolutional layers. The filter size that supports the convolution process may be small so that the network is able to capture more information in detail and discard unwanted information in each layer. In one embodiment, one-dimensional and thus relatively small filters are used to produce an efficient CVAE in terms of utilization of computing power and storage space. The CVAE can be implemented using existing software packages, such as TensorFlow. Example parameter values include batch_size=128, filters=16, and kernel_size=3. The batch_size typically corresponds to the fixed size of a tile. Embodiments are not limited to a particular filter size or the number of convolutional layers.

3.3. Training Data

Training data 122 comprises multiple training instances, each training instance corresponding to a tile. Some training instances are of one tile size (or time scale) while other training instances are of another tile size (or time scale). For example, each training instance in a first set of training instances comprises a set of aggregated values pertaining to one second of operational data and each training instance in a second set of training instances comprises a set of aggregated values pertaining to one minute of operational data.

Examples of types of aggregated values include minimum, maximum, mean, one standard deviation above the mean, one standard deviation below the mean, median, and different percentiles, such as $10^{th}$ percentile, $20^{th}$ percentile, and so forth. The set of aggregated values in each tile is organized the same, such that the first aggregated value in each set of aggregated values is of the one type (e.g., the minimum value), the second aggregated value in each set of aggregated values is of another type (e.g., the maximum value), and so forth.

In an embodiment, training data 122 comprises synthetic data, or aggregated data that is generated automatically, rather from any actual, real-world operational data. The synthetic data reflects different patterns that may be found in actual operational data. A motivation for synthetic data is to introduce or expose autoencoder 124 to different types of signal shapes so that autoencoder 124 may learn to efficiently adapt to real values from real signals. The more patterns that are reflected in the synthetic data, the more accurate the encodings are likely to be that are generated using autoencoder 124 or similar machine learning models that are trained based on the synthetic data. Training autoencoder 124 on synthetic data ensures generalizability of autoencoder 124; in other words, autoencoder 124 is able to recognize many different patterns and produce accurate encodings that reflect those patterns. Also, with synthetic training data, autoencoder 124 can immediately start producing encodings for newly generated tiles. For better performance, the autoencoder 124 trained from the synthetic data is then tuned (further trained) with real data, where the autoencoder 124 can easily adapt to real value and further capture nuanced patterns or features present in the real data to generate more accurate encodings. The efficiency of the autoencoder 124 resulting from small filters allows such tuning or further training to apply to the entire model.

3.4. Signal Generator

Figure 2A:
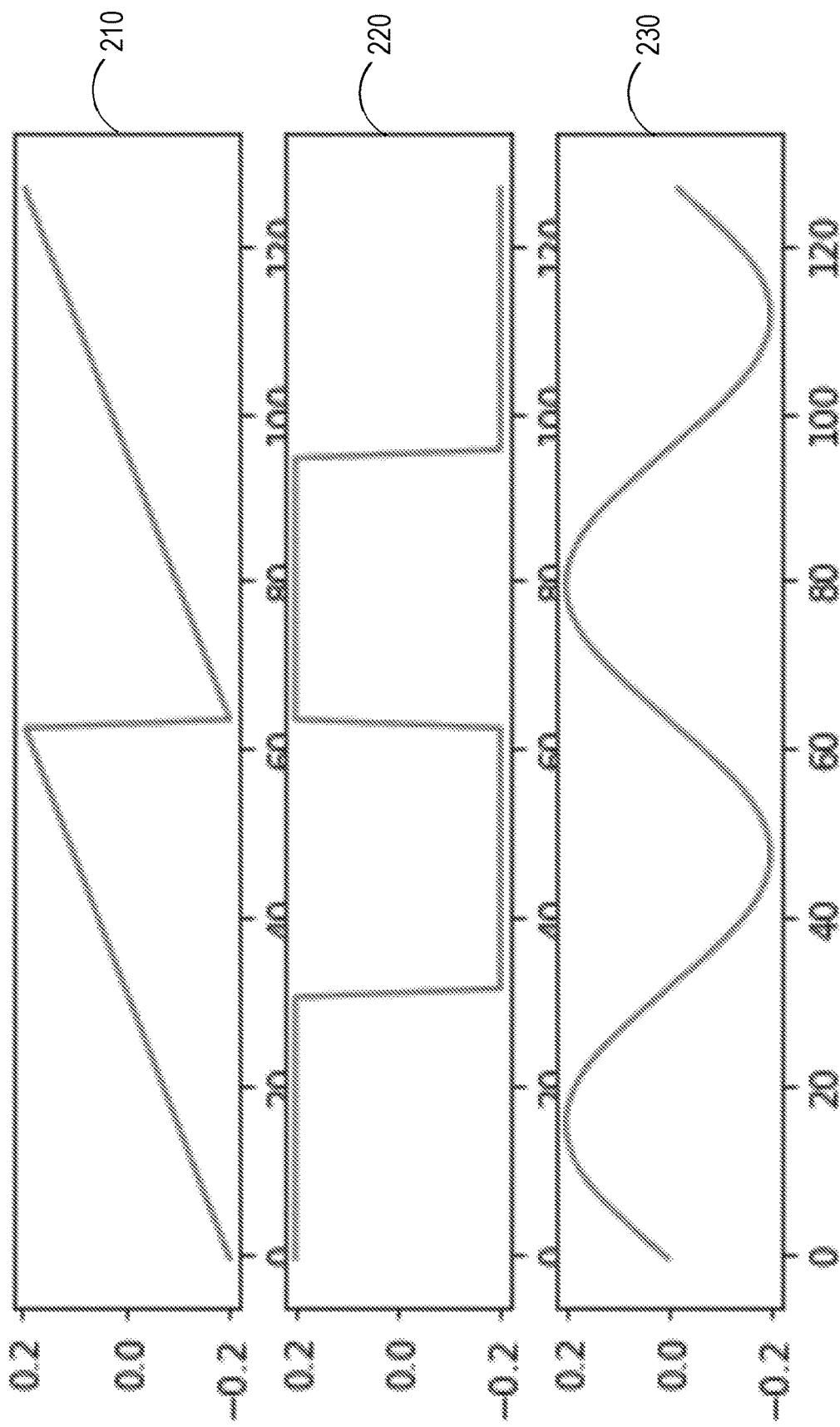
FIG. 2A depicts example types of signal shapes.
Figure 2B:
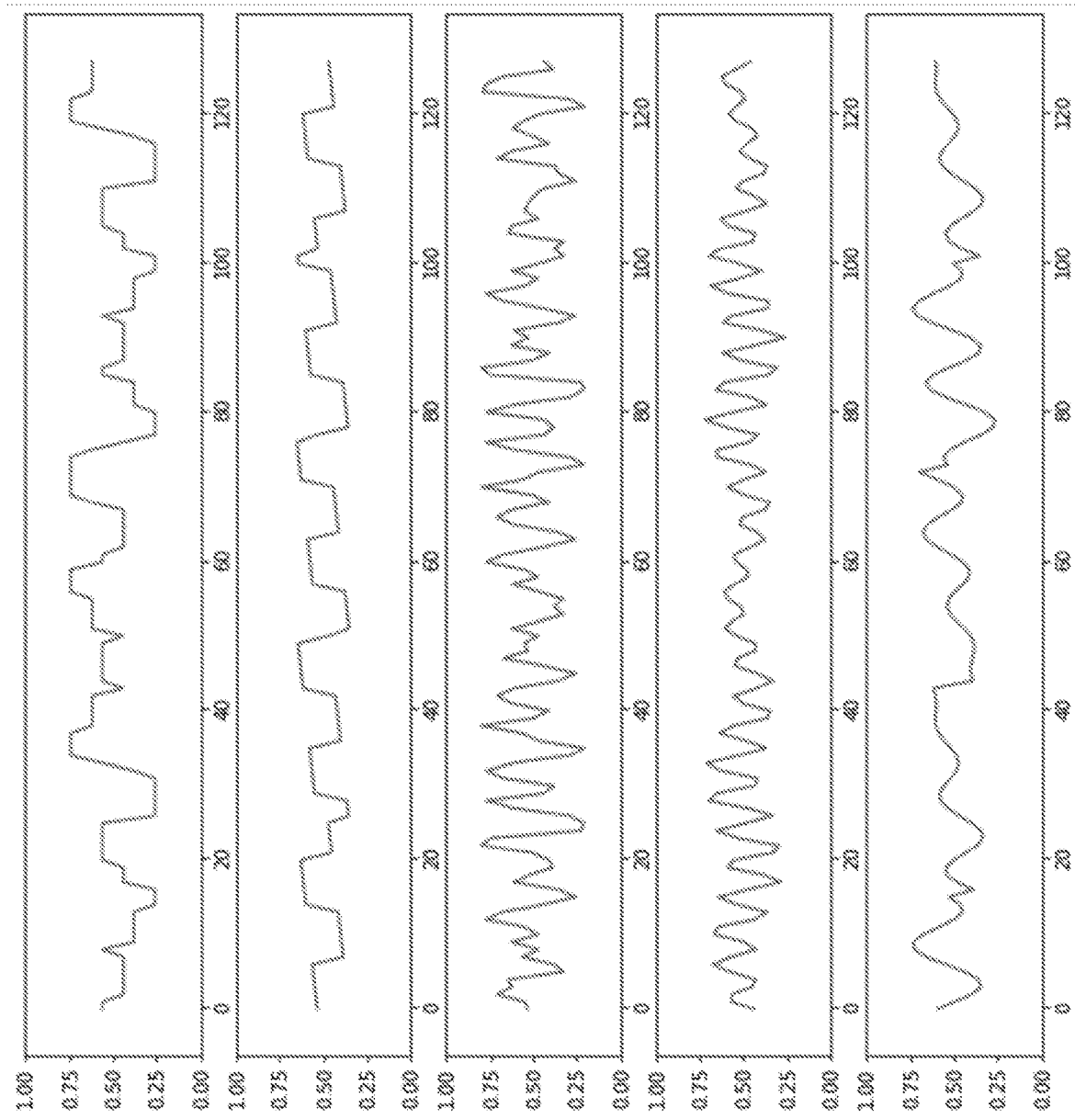
FIG. 2B depicts example signals that are automatically generated based on types of signal shapes and various signal transformations, in an embodiment.

In embodiments, synthetic training data is generated using a signal generator, not depicted. The signal generator generates synthetic signals based on two or more types of shapes. Example types of shapes include saw 210, step function 220, and sine 230, each of which is depicted in FIG. 2A. Signal generator generates a synthetic signal by adding segments of one type of signal shape with segments of one or more other types of signals. Examples of synthetic signals are depicted in FIG. 2B. Such generation may involve including random frequencies, phase shifts, and/or amplitudes to one or more signal segments that are added together with one or more other signal segments.

In this way, the signal generator may generate a virtually infinite training set, which allows autoencoder 124 to "learn" a vocabulary of shapes that autoencoder 124 will later use to encode real-world signals. If there are multiple autoencoders, one trained for each time scale (as described in more detail herein), then the synthetic signals may be shared across those autoencoders, allowing for the added comparability between latent encodings of these autoencoders.

3.4. Signal Generator

In embodiments, synthetic training data is generated using a signal generator, not depicted. The signal generator generates synthetic signals based on two or more types of shapes. Example types of shapes include saw 210, step function 220, and sine 230, each of which is depicted in FIG. 2A. Signal generator generates a synthetic signal by adding segments of one type of signal shape with segments of one or more other types of signals. Examples of synthetic signals are depicted in FIG. 2B. Such generation may involve including random frequencies, phase shifts, and/or amplitudes to one or more signal segments that are added together with one or more other signal segments.

In this way, the signal generator may generate a virtually infinite training set, which allows autoencoder 124 to "learn" a vocabulary of shapes that autoencoder 124 will later use to encode real-world signals. If there are multiple autoencoders, one trained for each time scale (as described in more detail herein), then the synthetic signals may be shared across those autoencoders, allowing for the added comparability between latent encodings of these autoencoders.

The synthetic signals may be normalized, for example, between 0 and 1. If so, then operational data may also be similarly normalized so that the resulting encodings are meaningful.

To prevent overtraining of autoencoder 124, training data 122 is kept separate from a validation set (not depicted; also comprising synthetic signals) that is used to validate autoencoder 124. The synthetic signals that are selected for the training set may be randomly selected.

A signal includes multiple components, such as shapes, frequencies, value distributions, slopes, and histograms. The number of components which are added up is directly proportional to the amount of information in the signal. The number of components can be chosen to exceed the capacity of autoencoder 124 to encode it. An ideal compression of the system includes a number of dimensions that is at least as high as the number of independent variables which control the input. Those variables include (per component): amplitude, frequency, and phase shift, plus a description of the shape. The number of dimensions in an ideal scenario may be determined by adding up the variables to represent the input entries. The number of components of the input is determined so that this dimensionality measure exceeds the dimensionality of the latent space. Choosing a number of components to exceed the capacity of autoencoder 124 forces the autoencoder to generalize and become more robust. Thus, if a network is trying to project motifs onto a 32-dimensional space, it would (provided it found a perfect compression) be able to encode up to 8-layered signals (since each signal is determined by its shape, frequency, amplitude and phase shift).

3.5. Number of Autoencoders

Although a single autoencoder 124 is depicted, system 100 may include multiple autoencoders or similar machine learning models, each corresponding to a different tile size or time scale. For example, a first autoencoder is trained on training instances covering a range of time but only pertaining to a first time scale and a second autoencoder is trained on training instances covering the same range of time but only pertaining to a second time scale that is different than the first time scale. The first encoder accepts, as input, aggregated data from each tile of the first time scale and generates an encoding for that tile while the second encoder accepts, as input, aggregated data from each tile of the second time scale and generates an encoding for that tile.

Alternatively, a single autoencoder 124 is trained based on training instances pertaining to tiles of differing sizes or at different scales.

3.6. Similarity

An attribute of an autoencoder is that similar inputs will generate similar encodings. In other words, similar encodings will occupy a similar space in a hyperspace defined by the latent dimensions of the encodings. In an embodiment, the similarity of two encodings is a proxy for the similarity between two inputs, each input representing a different tile, which is an aggregation of operational data. Similarity between two inputs, namely two time series where each data point is an aggregate over data points in the original sensor-generated data except at the lowest scale, or the two corresponding encodings, may be measured in one of multiple ways, including Euclidean distance and cosine similarity.

3.7. Encoding Storage

Encodings generated by autoencoder 124 are stored in encoding storage 126 which is persistent or non-volatile storage. Encoding storage 126 may or may not be separate from tile storage 112. If separate, then each tile in tile storage 112 may include a reference to its corresponding encoding in encoding storage 126 and/or each encoding in encoding storage 126 may include a reference to its corresponding tile in tile storage 112.

Performing comparisons between encodings may be a computationally-expensive process, particularly if the number of encodings is relatively large. A naïve approach to finding similar encodings given a particular encoding is to perform a scan of encoding storage 126 and, for each encoding, computing a similarity measure between the encoding and the particular encoding. Such a scan and similarity comparison requires significant computing resources and time. With the potential to generate hundreds of encodings per minute, efficient encoding storage techniques are implemented in the embodiments.

In an embodiment, system 100 generates one or more indexes to organize encodings in encoding storage 126. The indexes allow for the efficient identification of similar encodings. There may be multiple ways to index encodings, including locality-sensitive hashing and clustering, each of which is described in more detail herein. The encodings can also be indexed by other attributes, such as the corresponding time interval.

3.8. Encoding Process Overview

Figure 3:
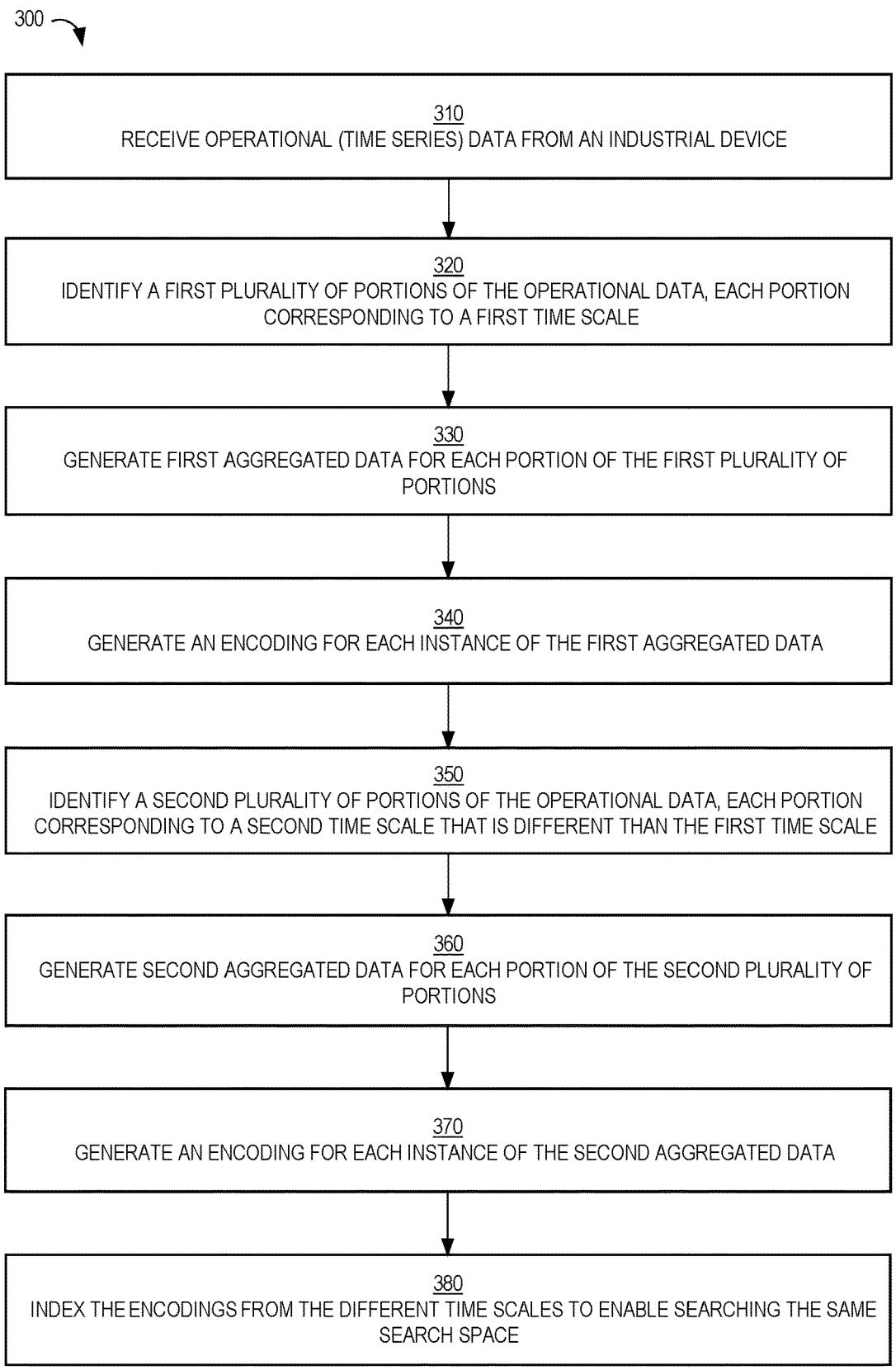
FIG. 3 is a flow diagram that depicts an example process for processing multi-scale time series data, in an embodiment.

FIG. 3 is a flow diagram that depicts an example process 300 for processing newly generated multi-scale time series data to generate encodings, in an embodiment. Process 300 is implemented by various elements of system 100.

At block 310, operational data is received from an industrial device. The operational data includes time series data that indicates a data value for different points in time. For example, the data value may be a water pressure value and the different points in time may be milliseconds apart, seconds apart, minutes apart, or some other time duration apart.

At block 320, a first plurality of portions of the operational data is identified. Each portion of the first plurality of portions corresponds to a first time scale or resolution, such as a minute duration.

At block 330, first aggregated data is generated for each portion of the first plurality of portions. The first aggregated data includes multiple aggregated data values that are generated based on the portion of the operational data to which the first aggregated data corresponds.

At block 340, an encoding is generated for each instance of the first aggregated data. Thus, if there are ten portions in the first plurality of portions, ten encodings are generated. Block 340 is performed by autoencoder 124.

Blocks 350-370 are similar to blocks 320-340, except with respect to time scale.

At block 350, a second plurality of portions of the operational data is identified. Each portion of the second plurality of portions corresponds to a second time scale that is different than the first time scale. For example, the second time scale may be an hour time scale while the first time scale may be a minute duration. Also, the second plurality of portions may include the first plurality of portions or vice versa. For example, the first plurality of portions may correspond to a time period that is included in a time period to which the second plurality of portions correspond. As discussed above, tiles for higher resolutions can be generated from rolling up data in tiles for lower resolutions. At block 360, second aggregated data is generated for each portion of the second plurality of portions. The second aggregated data includes multiple aggregated data values that are generated based on the portion of the operational data to which the second aggregated data corresponds.

At block 370, an encoding is generated for each instance of the second aggregated data. Block 370 is likewise performed by autoencoder 124 or another autoencoder that has been trained or tuned based on signals pertaining to the second time scale. In other embodiments, the encodings covering a common time interval can be generated after all the time tiles covering the same time interval are generated.

At block 380, the encodings corresponding to the different time scales are indexed in the same search space. This allows encodings across multiple time scales to be searched and used in multiple ways, such as signal prediction, anomaly detection, and anomaly measure generation, each of which is described in more detail herein.

4.0. Utilizing Encodings to Manage Machine Operations

In an industrial environment, a machine at any given time can be in any condition, such as startup, normal-operation, cool-down, etc. Some of the conditions are considered normal, while some of the conditions are considered abnormal and best prevented, such as an unexpected halt or shutdown. In today's industrial environment, a machine often generates complex signals full of variations. (Those variations that have not been observed by the system 100 may be considered as "anomalies" initially, as further discussed below.) Some of these variations may correspond to normal conditions, while some of them may correspond to abnormal conditions. Conversely, each normal or abnormal condition could be associated with a set of sensor signals having specific values. Each condition can thus typically be characterized by one or more features (e.g., patterns in these variations) in the associated time series data from one or more signals. It is especially helpful to properly characterize abnormal conditions and predict or catch them.

Encodings instead of original operational data generated by sensors can be efficiently analyzed to understand or predict machine behavior. For example, given an encoding corresponding to a recent time when a specific machine condition occurs, such as an unexpected shutdown, similar encodings corresponding to older times can be found to see whether there is a pattern in the occurrences of an unexpected shutdown in terms of time or sensor values. For further example, by considering additional encodings corresponding to the times prior to the occurrences of the specific machine condition and identify patterns also in those additional encodings, it is possible to determine warning signs for abnormal conditions in machine operations and prevent abnormal conditions from occurring or prepare for abnormal conditions as soon as possible.

Similar encodings can be assigned similar index values so that similar encodings can be quickly found. Some of the similar encodings could be pre-grouped. Alternatively, any given encoding at a particular scale can be compared with some or all existing encodings at the particular scale individually or collectively using a known similarity measure to identify similar encodings.

4.1.0. Grouping Similar Encodings 4.1.1. Hashing

In an embodiment, a hashing technique is used to quickly assign each encoding to one of multiple groups or "buckets." It is presumed that all encodings that are assigned to the same bucket will have roughly similar values. The greater the number of buckets, the less dense each bucket will be (i.e., the average number of encodings per bucket will decrease) and, thus, the fewer comparisons will be performed per bucket. However, the greater the buckets, the more likely that two encodings that are similar are assigned to different buckets.

One example hashing technique is locality-sensitive hashing (LSH). LSH hashes input items so that similar items map to the same "buckets" with high probability (the number of buckets being smaller than the universe of possible input items). LSH differs from conventional and cryptographic hash functions because LSH aims to maximize the probability of a "collision" for similar items. LSH has much in common with data clustering and nearest neighbor search. Hashing-based approximate nearest neighbor search algorithms generally use one of two main categories of hashing methods: either data-independent methods, such as LSH, or data-dependent methods, such as locality-preserving hashing (LPH).

A hash generated by an LSH technique has a length n, where, initially, n random vectors $v_i$ are generated.

$$h_i = \text{sign}(v_i * x)$$

$lsh(x) = (h_1(x), h_2(x) \ldots, h_n(x))$ where x is an encoding, $h_i$ is a function that produces a 0 or 1, and $lsh(x)$ produces a vector of size n comprising 0s and/or 1s.

If $v_i$ is a normal vector (or "hashing vector") that describes a hyperplane and if x lies on the same side with the normal vector, then $h_i=1$; otherwise $h_i=0$. Hashing vector $v_i$ may have the same dimensionality as the encodings (e.g., x). Alternatively, hashing vector $v_i$ may have a different (e.g., smaller) dimensionality than the dimensionality of the encodings.

FIGS. 4A-4C are example graphs that illustrate how a hashing technique might work, in an embodiment. Each of FIGS. 4A-4C includes three two-dimensional encodings. In a real-world example, encodings may be tens or hundreds of dimensions. Because encodings 410 and 420 had similar sets of aggregated values, those encodings are more similar to each other than either is to encoding 430.

FIG. 4B also includes a (e.g., random) hashing vector $v_1$ while FIG. 4C includes a "hash" vector $v_2$. After FIG. 4B, but before FIG. 4C, the LSH vector for encoding 410 (which may be denoted $lsh(V_1)$) is $(1, h_2)$, $lsh(V_2)$ is $(1, h_2)$, and $lsh(V_3)$) is $(1, h_2)$. Thus, the first hashing vector $v_1$ resulted in each word being associated with the same first LSH bit. After FIG. 4C, $lsh(V_1)$ is $(1,1)$, $lsh(V_2)$ is $(1, 1)$, and $lsh(V_3)$) is $(1, 0)$. Thus, if there are only two hashing vectors, encodings 410 and 420 would be assigned to the same group or bucket while encoding 430 would be assigned to a different group or bucket.

One variation of LSH that may be used to assign encodings to buckets is super-bit LSH (SBLSH), which expands on random projection. SBLSH involves generating batches of normalized vectors that are perpendicular to each other. This is referred to as orthogonalizing vectors. SBLSH ensures lower variance within a bucket compared to the LSH approach, where higher variance means more false negatives.

In an embodiment, the hashing vector that is computed for each encoding is used to store the corresponding encoding in encoding storage 126. In this way, each encoding (and/or an identifier for the encoding) that is associated with the same hash vector is stored, in encoding storage 126, in association with each other. For example, a hashing vector maps to a particular entry in a hash table, where each entry in the hash table is associated with a linked list or an array of encoding identifiers that map to that entry and, optionally, each entry in the hash table includes (or is otherwise associated with) the encodings that map to that entry.

4.1.2. Clustering

Clustering is another approach for grouping similar encodings. An example of clustering is k-means clustering. The value of k defines a number of clusters to which encodings will be assigned. The greater the value of k, the fewer the encodings per cluster. In an embodiment, clustering may occur on encodings that are generated based on the training data. This is helpful since the clustering can be performed offline, or before autoencoder 124 is utilized in a real-world environment operating on new, never-before-seen operational data. Each cluster is represented by an encoding, referred to as the cluster's representative encoding. Then, for each new encoding that is generated based on new operational data, the new encoding is only compared to each representative encoding. For example, for a new encoding, if there are one hundred clusters, then a one hundred similarity measures are computed, one for each representative encoding relative to the new encoding.

In an embodiment, only the cluster that is associated with the highest similarity measure relative to a new encoding is selected as a match (i.e., the new encoding is assigned to that cluster). Alternatively, the top N clusters with the top N highest similarity measures are selected as a match with respect to the new encoding. If N is greater than one, then a new encoding may be assigned to multiple clusters. Alternatively still, an encoding may be assigned to any cluster that is associated with a similarity measure that is above a certain threshold. Thus, some encodings may be assigned to multiple clusters while some encodings may be assigned to only one cluster.

One way to store groups or clusters of encodings is through segregating the groups or clusters from each other in storage, whether physically or logically. For example, each group or cluster of encodings may be stored in a separate table in a relational database. As another example, each cluster of encodings may be stored in a separate folder in a file system.

4.1.3. Intra-Group/Cluster Matching

System includes encoding matcher 128 that, given a particular encoding, identifies a match for that particular encoding relative to other encodings in encoding storage 126. In an embodiment, once a group of encodings is determined (e.g., based on a hashing approach or a clustering approach), encoding matcher 128 generates a similarity measure for each pair of encodings in the group. In this way, the groups are used to narrow the scope of the number of similarity measures that need to be generated. As described above, cosine similarity and Euclidean distance are two ways in which a similarity measure between two encodings may be computed.

In response to detecting a match between two encodings, an attribute of each encoding may be updated to identify the other encoding. For example, each encoding may be associated with a list of identifiers of matching encodings. The respective lists of some encodings may be empty, indicating that the time series patterns that correspond to those encodings are currently considered unique. The respective lists of other encodings may be long, indicating that the time series patterns that correspond to those encodings are relatively common. It is possible that encoding A matches encoding B, which matches encoding C; but encoding A does not match encoding C. Therefore, the list of matching encodings for each of encodings A-C may be different.

In an embodiment, a threshold similarity measure is defined such that, if a similarity measure of a pair of encodings is above the threshold similarity measure, then the corresponding encodings are considered similar; otherwise, the corresponding encodings are not considered similar. The threshold similarity measure may be manually determined and adjusted.

Alternatively, the threshold similarity measure may be determined automatically. For example, a prediction model is training based on multiple training instances, where each training instances includes a similarity measure (e.g., a cosine similarity) for a pair of encodings and a label indicating whether a human observer considered the corresponding patterns (i.e., the patterns on which the corresponding aggregated values were based) similar. The labels may be based on human labelers who are under the supervision of the entity employing the prediction model.

One set of training instances may be used to train the prediction model and another set of training instances may be used to validate the prediction model. A threshold prediction value may be manually or automatically chosen to ensure maximum recall, maximum precision, or a balance between recall and precision. Future output values from the prediction model will be compared to the threshold prediction value. For example, if an output value is greater than the threshold prediction value, then the corresponding encodings are considered similar to each other.

4.2.0. Cross-Time Scale Encoding Search

In an embodiment, system 100 includes a cross-time scale searcher 130. Given an encoding that corresponds to a signal or tile of one time scale, cross-time scale searcher 130 searches encoding storage 126 for similar encodings (e.g., in terms of cosine similarity). The similar encodings may have already been identified for (and associated with) the given encoding. Thus, this step may involve a simple look up.

Cross-time scale searcher 130 also identifies one or more higher level encodings (i.e., of a longer time scale) that includes the time associated with the given encoding. For example, the given encoding corresponds to a signal that began at time T and lasted one second. A higher level encoding is one that corresponds to a signal that lasted one minute and that one minute included time T. Another higher level encoding is one that corresponds to a signal that lasted one hour and that one hour included time T. The identification of the one or more higher level encodings may be performed before, after, or during the identification of similar encodings.

For each similar encoding in the identified set of similar encodings, cross-time scale searcher 130 also identifies one or more higher level encodings (i.e., of a longer time scale) that includes the time associated with that identified encoding. The number of higher level encodings identified for the given encoding is the same as the number of higher level encodings identified for the similar encodings.

For each similar encoding in the identified set of similar encodings, cross-time scale searcher 130 compares an identified higher level encoding of the similar encoding with a higher level encoding of the given encoding. For example, if the given encoding and each similar encoding are one-second encodings and the higher level encodings are one-minute encodings, then cross-time scale searcher 130 compares the one-minute encoding associated with the given encoding to a one-minute encoding associated with an identified similar encoding. The comparison (e.g., a Euclidean distance or a cosine similarity) indicates how similar the corresponding one-minute signals are to each other. This overall process may be used in signal prediction and anomaly measures, as described in more detail herein.

4.3.0. Signal Prediction

In an embodiment, system 100 includes a signal predictor 132. Given an encoding of a particular signal (from a particular sensor) corresponding to a particular time interval, signal predictor 132 searches encoding storage 126 for similar encodings of the signal corresponding to time intervals prior to the particular time interval. Signal predictor 132 may perform this search for each received time series of tile data prior to this encoding or only for certain time series data, such as for time series data for which an abnormal condition is detected, for time series data for which a certain level of abnormality is detected (e.g., "very abnormal"), and/or for time series data selected by a human user. Specific time series data may be selected by inputting a specific time and selecting a pre-defined time scale (e.g., a one-minute time scale) or by selecting a portion of existing time series data (that is presented on a GUI) using a graphical selection tool.

After identifying similar encodings to a given encoding, signal predictor 132 identifies a times series of tile data or encodings corresponding to times around the time of the similar encodings to determine what happened around those times. For example, for a given encoding corresponding to time T98, signal predictor 132 identifies similar encodings to the given encoding, which correspond to times T21 and T45. Signal predictor 132 identifies time series data or encodings corresponding to times T22 and T46. If encodings associated with times T22 and T46 are associated with abnormal conditions, then signal predictor 132 determines that an abnormal condition is likely to occur at time T99.

Additionally or alternatively to considering encodings at the same time scale, signal predictor 132 may consider encodings at a different time scale. For example, a given encoding corresponds to one second on day D43 at time T81. Signal predictor 132 identifies encodings that are similar to the given encoding and corresponding to, respectively, two seconds on day D15 at time T97 and on day D32 at time T11. Based on these two similar encodings, signal predictor 132 identifies (1) an encoding corresponding to one hour on day D15 and includes T97 and (2) an encoding corresponding to one hour on day D32 and includes time T11. If these two one-hour time series data are not associated with abnormal conditions, then signal predictor 132 may determine that an abnormal condition is not likely to occur on day 43 at an hour that includes time T99. In some embodiments, the encoding at the second level and the encoding at the hour level covering the same time point are considered as a unit for comparison purposes.

If only one similar encoding is identified for a given encoding, then a predicted condition may be the condition for the one similar encoding. If multiple similar encodings are identified based on a given encoding, then a predicted condition may be a combination or aggregation of the conditions of the similar encodings. Sometimes, the corresponding encoding or time series data can also be a combination or aggregation of the similar encodings or corresponding time series data. For example, if three encodings are identified based on a given encoding, then the three encodings or the corresponding time series of tile data may be averaged to generate a predicted encoding or time series. When aggregating (e.g., averaging) multiple time series of tile data, the multiple signals may be given equal weight or some signals may be weighted more than others. Time series data with a higher weight than other signals will have more of an influence or effect on the predicted time series data than time series data with a lower weight will have on the predicted Time series data. For example, similar time series data corresponding to more recent time intervals are weighted higher than similar time series data corresponding to time intervals further in the past. As another example, similar time series data whose encodings are closer to a given encoding (e.g., in terms of Euclidean distance) are weighted higher than similar signals whose encodings are not as close to the given encoding.

In an embodiment, a predicted time series of tile data is compared to an actual time series data. Such a comparison may be performed in one or more ways. For example, a difference between the predicted time series and the actual time series data is computed (e.g., through subtraction). Thus, each data point in the predicted time series data is compared to a corresponding point in the actual time series data. The differences (both positive and negative) may be added to generate a difference value that is divided by the number of data points in one of the signals. Alternatively, the absolute value of each difference is computed and added to the other absolute values to generate the difference value. Prior to such a comparison, either the predicted time series data or the actual time series data may be shifted so that the respective time series data align better, reducing the computed difference.

As another example of a way to compare two signals, a similarity measure (e.g., Euclidean distance) is computed between an encoding of the predicted time series data and an encoding of the actual time series data.

In either approach, a relatively large computed difference between a predicted time series data and an actual time series data indicates that signal predictor 132 did not perform an accurate prediction. Conversely, a relatively small computed difference between a predicted time series data and an actual time series data indicates that signal predictor 132 did perform an accurate prediction. If the number of inaccurate predictions is greater than the number of accurate predictions, then logic of signal predictor 132 may be modified to employ a different approach to signal prediction, or the machine learning model for generating encodings can be retrained. A machine-learned signal predictor is described in more detail herein.

4.4.0. Anomaly Detection

In an embodiment, system 100 includes an anomaly detector 134 that detects anomalies reflected in operational data. An anomaly is a time series feature or pattern that deviates from what is expected by the system. If a signal component in operational data has not been seen before by the system, then that signal is considered an anomaly. The system can be expected to perform "badly" in response to an anomaly, namely new input data that is substantially different from the training data and that could contribute to any not-yet-recognized feature of an existing machine condition or a not-yet-recognized machine condition. The encountering of an anomaly can serve as an alert that the system is to be retrained with new data including or related to the anomaly.

An anomaly may be detected in one or more ways. For example, anomaly detector 134 inputs an encoding of a new time series generated by the encoder part of autoencoder 124 into the decoder part of autoencoder 124 to produce an output that is similar in structure to the input (to autoencoder 124) comprising aggregated values that were used to produce the encoding. Anomaly detector 134 compares the output to the input. The difference between the output and the input is referred to as "reconstruction error" (RE). The greater the RE of the new time series, the greater the new information in the new time series. A resulting large RE may indicate that the new time series is an anomaly, which can then trigger the collection of new training data and the retraining of the machine learning model based on the new training data.

An RE of a time series may also be associated with an encoding that was generated for that time series. If the RE of a time series (or encoding) is greater than an RE threshold, then anomaly detector 134 records the signal (or encoding) as representing an anomaly. System 100 may include a separate anomaly storage that includes an anomaly data item for each detected anomaly. An anomaly data item may include an encoding identifier for the corresponding encoding, a tile identifier that identifies the tile from which the encoding was generated, the RE of the time series, a timestamp that indicates when the anomaly was detected, a stream identifier that identifies the stream in which original time series data from which the tile was built was found, whether the anomaly was reviewed by a human user, and/or what actions were performed automatically or manually as a result of the anomaly.

In an embodiment, different levels of RE trigger different actions. For example, if the RE of a signal is greater than a first threshold, then a dashboard comprising a graphical user interface (GUI) is updated to indicate the anomaly. The dashboard may be presented on a screen of a computer located (a) at an industrial site that produced the operational data or (b) remote from the industrial site. An engineer or other worker associated with the industrial site may operate the computer. If the RE is greater than a second threshold, then the dashboard is updated and an electronic message (e.g., SMS message, email message, or a smartphone app message) is transmitted to one or more individuals informing those individuals of the anomaly. If the RE is greater than a third threshold, then the prior actions are performed in addition to an audible warning sound that is broadcast in at the industrial site where the operational data is produced.

In an embodiment, one or more anomalies trigger the tuning or retraining of autoencoder 124. For example, autoencoder 124 is tuned for every N anomalies that anomaly detector 134 detects. Tuning autoencoder 124 does not require retraining from original training data 122. Instead, autoencoder 124 is trained only on the signals that resulted in anomalies being detected.

4.4.1.0. Anomaly Measures

While RE may be used as a measure of an anomaly, RE applies to one time series does not take into account other time series. In an embodiment, an anomaly measure is generated based on the RE of a time series and the REs of similar signals, which can be helpful for determining when to retrain the machine learning model, for example. For example, if anomaly detector 134 detects that a particular time series is anomalous, since each anomalous time series or the receipt thereof is typically recorded, the anomaly detector can search for the pool of recorded anomalous time series or their encodings for similar ones (e.g., by comparing the particular encoding to encodings in the pool or a particular cluster to which the particular encoding belongs). For each encoding that is considered similar to the particular encoding (e.g., based on Euclidean distance), the RE of the particular time series is compared to the RE of each identified similar the time series. If there are multiple similar encodings, then the RE of the particular signal may be compared to the mean or median RE of the corresponding similar time series. If the difference between the RE of the particular time series and the mean or median RE (or the RE of the closest signal) is greater than a certain threshold, then the particular time series is considered (or classified as) "very anomalous," which may trigger certain actions, such as the transmission of electronic messages or the sounding of an alarm. The difference in REs may be used as an anomalous measure.

Another example of a type of anomaly measure for a time series is the number of anomalies detected in portions of the time series. For example, if a particular time series represents a single hour, then an anomaly measure for that particular time series is a number of anomalies detected at one-minute signals that are within the time period of the particular signal. Again, an anomaly of a one-minute time series is where the RE of the one-minute time series is above a certain threshold. Thus, the greater the number of anomalies, of time series at a first time scale, that are detected within a time period, the greater the anomaly measure of the time series, at a second time scale that is higher than the first time scale, that includes the time series.

Another example of a type of anomaly measure for a signal is the number of similar time series as determined by comparing their respective encodings (e.g., cosine similarity). The fewer the number of similar signals for a given time series, the higher the anomaly measure. Thus, even though a given time series may have a low RE due to the comprehensiveness of training data 122, that given signal may still be considered anomalous because nothing similar has been seen before.

The greater the anomaly measure of a time series, the more likely that certain actions (as described herein) will be triggered, such as dashboard update, notification messages transmitted, and the setting off of audible/visible alarms.

4.5.0. Classification Model

In an embodiment, encodings from different time scales are used to train a classification model that classifies the state of a system or machine that produces the corresponding operational data from which the encodings are generated.

In order to generate training data for the classification model, a human labeler may manually select a set of tiles (e.g., from tile storage 112) covering the same time interval that represents a time series (or portion of operational data) that indicates a certain machine state that needs to be identified or classified. There may be two or more possible states from which to choose. Then, system 100 (or machine learning component 120, specifically) may automatically identifies the set of tiles as training tiles for characterizing that certain state/classification, or one or more tiles leading up to (or temporally preceding) each of the set of tiles as training tiles for characterizing any "precursor" to the certain state/classification. One or more of the training tiles may be of the same time scale as the particular tile. Additionally or alternatively, one or more of the training tiles may be of a different time scale than the time scale of the particular tile. The encodings of the set of tiles can be concatenated encoding or otherwise combined to form one feature vector for classification purposes.

Machine learning component 120 automatically generates a training instance for each tile selection. Each training instance includes a label identifying the manually selected state/classification and, as feature values to include in the training instance, an encoding from each of the identified training tiles for supervised learning. Thus, if there are seven training tiles, the training instance includes seven encodings. Each training instance can only the encodings for unsupervised learning.

For basic classification of each isolated condition, many known models can be used, such as a feedforward neural network, k-nearest neighbors, or logistic regression for supervised learning or other unsupervised techniques. To account for any potential temporal relationships among isolated conditions, more complex classification can be performed, as further discussed below. For example, instead of focusing on the features characterizing a particular condition, multiple conditions that occur in some temporal order can be tracked and recognized through more complex classification.

4.5.1. LSTM

One example of a machine-learned model that may be used for classification or prediction is a long short-term memory (LSTM) network, which is a type of recurrent neural network (RNN). LSTM networks are well-suited to classifying, processing, and making predictions based on time series data because there may be lags of unknown duration between important events in a time series. LSTM networks were developed to deal with the vanishing gradient problem that can be encountered when training traditional RNNs. Relative insensitivity to gap length is one advantage of LSTM over RNNs, hidden Markov models, and other sequence learning methods in numerous applications. Other examples include echo state networks or transformers.

An LSTM network includes an LSTM portion and, optionally, a non-LSTM portion that takes, as input, output from the LSTM portion and generates an output (e.g., a classification) of its own. The LSTM portion includes multiple LSTM units. Each LSTM unit in an LSTM network may be identical in structure to every other LSTM unit in the LSTM network.

The number of LSTM units in the LSTM portion of a LSTM network may be established or fixed by analyzing the length of past sequences of signals that correspond to a certain classification, or machine or system state. For example, the vast majority of classifications require at least five signals/tiles in a sequence in order to accurately classify the sequence. Therefore, the number of LSTM units in the forward layer and the backward layer of the LSTM portion may be five. If, for whatever reason, there are less than five signals/tiles in a sequence, then one or more instances of an encoding for "padding" is used. For example, if a sequence is only two characters and the number of LSTM units in each layer is five, then three instances of a padding encoding are generated or retrieved and inputted into those layers along with encodings for the two signals/tiles. If there are any padding encodings, then the padding encodings may be placed subsequent to the retrieved encodings when input to the forward and backward layers.

For training a LSTM for signal prediction, the training data is similar to the classification scenario, except instead of a classification label in each training instance, each training instance includes an encoding of an actual tile, where the training tiles temporally precede the actual tile. Again, the actual tile may be selected manually by a human user; however, system 100 (or machine learning component 120, specifically) may automatically identify training tiles for each tile selection and generate training instances based on the tile selections.

5.0. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
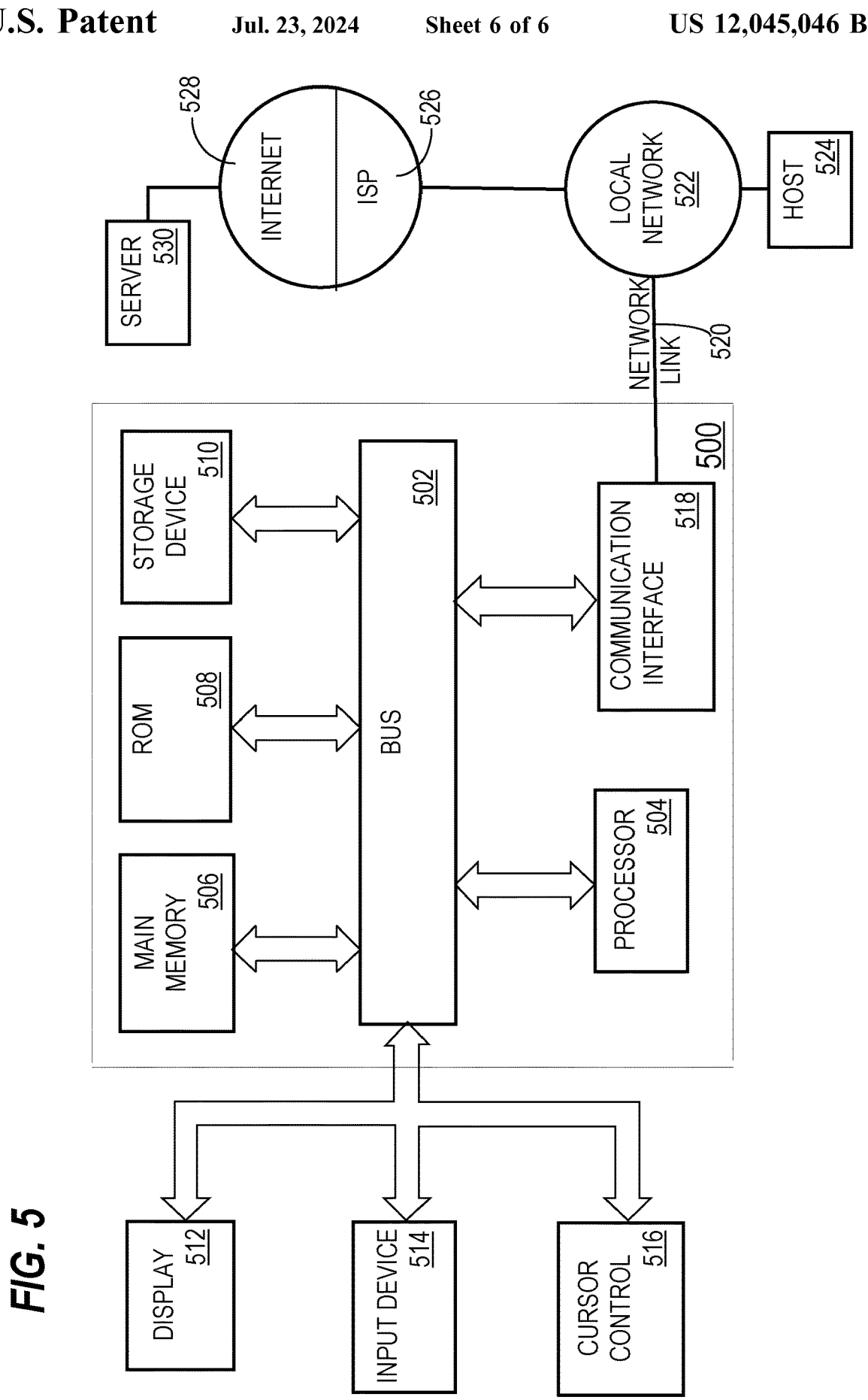
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
    receiving operational time series data from sensors coupled to an industrial device, the operational time series data corresponding to a time interval;
    identifying a first set of portions of aggregated data of the operational time series data, wherein each portion of the first set of portions corresponds to a first time scale;
    for each portion of the first set of portions:
    generating, using a first digital encoding model, a first encoding based on the portion of aggregated data; and
    adding the first encoding to a first set of encodings;

identifying a second set of portions of aggregated data of the operational time series data, wherein each portion of the second set of portions corresponds to a second time scale that is different than the first time scale;

for each portion of the second set of portions:
generating, using a second digital encoding model, a second encoding based on the portion of aggregated data; and
adding the second encoding to a second set of encodings;

classifying, using a third digital classification model, the operational time series data to determine a condition of the industrial device during the time interval based on the first set of encodings and the second set of encodings;

performing, in response to the condition being an abnormality, an action of updating a graphical user interface to indicate an abnormality, sending an electronic message to a communication account, or transmitting an audible warning sound, wherein the method is performed by one or more computing devices.

2. The method of claim 1, further comprising sending an instruction to the industrial device that causes an operational adjustment to the industrial device based on the condition.

3. The method of claim 1, further comprising:
generating a plurality of synthetic time series based on predetermined distributions;
generating training data based on the plurality of synthetic time series;
using one or more machine learning techniques to train the first digital encoding model based on the training data.

4. The method of claim 1, wherein the first digital encoding model is different than the second digital encoding model.

5. The method of claim 1, wherein the first and second digital encoding models are the same digital encoding model.

6. The method of claim 1, further comprising:
indexing the first set of encodings and the second set of encodings in the same search space to create a search index;
given a first particular encoding, searching the search index for encodings that are similar to the first particular encoding according to a similarity measure and that are associated with the first time scale.

7. The method of claim 6, wherein the first particular encoding is associated with a first time period, further comprising:
given the first particular encoding, identifying a second particular encoding that is associated with the second time scale and that is associated with a second time period that includes the first time period;
searching the search index for encodings that are similar to the second particular encoding and that are associated with the second time scale.

8. The method of claim 1, wherein the first digital encoding model is a convolutional variational autoencoder.

9. The method of claim 1, further comprising:
generating, by a decoder of the first digital encoding model, based on a first particular encoding, a first output, wherein the first particular encoding is generated based on first particular aggregated data;
performing a comparison of the first output and the first particular aggregated data;
based on the comparison, determining whether a times series that corresponds to the first particular aggregated data represents an anomaly.

10. The method of claim 9, further comprising:
in response to determining that the time series represents an anomaly, generating a training instance based on the first particular aggregated data;
further training the first digital encoding model based on the training instance.

11. The method of claim 1, further comprising:
indexing the first set of encodings and the second set of encodings in the same search space to create a search index;
based on the search index and a first particular encoding that was generated by the first digital encoding model, identifying a plurality of candidate encodings;
for each candidate encoding of the plurality of candidate encodings:
performing a comparison of said each candidate encoding to the first particular encoding; and
based on the comparison, determining whether said each candidate encoding is similar to the first particular encoding;
determining a number of the plurality of candidate encodings that are similar to the first particular encoding;
generating an anomaly measure based on the number.

12. The method of claim 1, further comprising:
indexing the first set of encodings and the second set of encodings in the same search space to create a search index;
based on the search index and a first particular encoding that was generated by the first digital encoding model, identifying a plurality of candidate encodings;
for each candidate encoding of the plurality of candidate encodings:
performing a comparison of said each candidate encoding to the first particular encoding;
based on the comparison, determining whether said each candidate encoding is similar to the first particular encoding; and
adding said each candidate encoding to a set of similar encodings if it is determined that said each candidate encoding is similar to the first particular encoding;
computing a first reconstruction error of the first particular encoding;
determining a reconstruction error of each encoding in the set of similar encodings;
generating an anomaly measure based on the first reconstruction error and the reconstruction error of each encoding in the set of similar encodings.

13. The method of claim 1, wherein a portion of aggregated data of the first set of portions of aggregated data includes one or more of a maximum, a minimum, a median, a mean, or a standard deviation of certain time series data associated with said portion of the first set of portions.

14. A system, comprising:
a memory;
one or more processors coupled to the memory and configured to perform:
receiving operational time series data from sensors coupled to an industrial device, the operational time series data corresponding to a time interval;
identifying a first set of portions of aggregated data of the operational time series data, wherein each portion of the first set of portions corresponds to a first time scale;

for each portion of the first set of portions:
  generating, using a first digital encoding model, a first encoding based on the first portion of aggregated data; and
  adding the first encoding to a first set of encodings;
identifying a second set of portions of aggregated data of the operational time series data, wherein each portion of the second set of portions corresponds to a second time scale that is different than the first time scale;
for each portion of the second set of portions:
  generating, using a second digital encoding model, a second encoding based on the portion of aggregated data; and
  adding the second encoding to a second set of encodings;
classifying, using a third digital classification model, the operational time series data to determine a condition of the industrial device during the time interval based on the first set of encodings and the second set of encodings;
performing in response to the condition being an abnormality, an action of updating a graphical user interface to indicate an abnormality, sending an electronic message to a communication account, or transmitting an audible warning sound.

15. One or more non-transitory computer-readable storage media storing instructions which, when executed by one or more processors, cause:
  receiving operational time series data from sensors coupled to an industrial device, the operational time series data corresponding to a time interval;
  identifying a first set of portions of aggregated data of the operational time series data, wherein each portion of the first set of portions corresponds to a first time scale;
  for each portion of the first set of portions:
    generating, using a first digital encoding model, a first encoding based on the portion of aggregated data; and
    adding the first encoding to a first set of encodings;
  identifying a second set of portions of aggregated data of the operational time series data, wherein each portion of the second set of portions corresponds to a second time scale that is different than the first time scale;
  for each portion of the second set of portions:
    generating, using a second digital encoding model, a second encoding based on the portion of aggregated data; and
    adding the second encoding to a second set of encodings;
  classifying, using a third digital classification model, the operational time series data to determine a condition of the industrial device during the time interval based on the first set of encodings and the second set of encodings;
  performing in response to the condition being an abnormality, an action of updating a graphical user interface to indicate an abnormality, sending an electronic message to a communication account, or transmitting an audible warning sound.

16. The one or more non-transitory computer-readable storage media of claim 15, wherein the instructions, when executed by the one or more processors, further cause:
  generating a plurality of synthetic time series based on predetermined distributions;
  generating training data based on the plurality of synthetic time series;
  using one or more machine learning techniques to train the first digital encoding model based on the training data.

17. The one or more non-transitory computer-readable storage media of claim 15, wherein the instructions, when executed by the one or more processors, further cause:
  indexing the first set of encodings and the second set of encodings in the same search space to create a search index;
  given a first particular encoding, searching the search index for encodings that are similar to the first particular encoding according to a similarity measure and that are associated with the first time scale.

18. The one or more non-transitory computer-readable storage media of claim 15, wherein the instructions, when executed by the one or more processors, further cause:
  generating, by a decoder of the first digital encoding model, based on a first particular encoding, a first output, wherein the first particular encoding is generated based on first particular aggregated data;
  performing a comparison of the first output and the first particular aggregated data;
  based on the comparison, determining whether a times series that corresponds to the first particular aggregated data represents an anomaly.

19. The one or more non-transitory computer-readable storage media of claim 15, wherein the instructions, when executed by the one or more processors, further cause:
  indexing the first set of encodings and the second set of encodings in the same search space to create a search index;
  based on the search index and a first particular encoding that was generated by the first digital encoding model, identifying a plurality of candidate encodings;
  for each candidate encoding of the plurality of candidate encodings:
    performing a comparison of said each candidate encoding to the first particular encoding; and
    based on the comparison, determining whether said each candidate encoding is similar to the first particular encoding;
  determining a number of the plurality of candidate encodings that are similar to the first particular encoding;
  generating an anomaly measure based on the number.

20. The one or more non-transitory computer-readable storage media of claim 15, wherein the instructions, when executed by the one or more processors, further cause:
  indexing the first set of encodings and the second set of encodings in the same search space to create a search index;
  based on the search index and a first particular encoding that was generated by the first digital encoding model, identifying a plurality of candidate encodings;
  for each candidate encoding of the plurality of candidate encodings:
    performing a comparison of said each candidate encoding to the first particular encoding;
    based on the comparison, determining whether said each candidate encoding is similar to the first particular encoding; and
    adding said each candidate encoding to a set of similar encodings if it is determined that said each candidate encoding is similar to the first particular encoding;
  computing a first reconstruction error of the first particular encoding;
  determining a reconstruction error of each encoding in the set of similar encodings;

generating an anomaly measure based on the first reconstruction error and the reconstruction error of each encoding in the set of similar encodings.

\* \* \* \* \*